US012630201B2

(12) United States Patent (10) Patent No.: US 12,630,201 B2

Tione (45) Date of Patent: May 19, 2026

---

(54) ELECTROMECHANICAL ASSEMBLY FOR A BRAKING SYSTEM OF A RAILWAY VEHICLE, CONTROL SYSTEM OF THE ELECTROMECHANICAL ASSEMBLY, AND BRAKING SYSTEM INCLUDING THE ELECTROMECHANICAL ASSEMBLY AND THE CONTROL SYSTEM

(71) Applicant: FAIVELEY TRANSPORT ITALIA S.P.A., Turin (IT)

(72) Inventor: Roberto Tione, Turin (IT)

(73) Assignee: FAIVELEY TRANSPORT ITALIA S.P.A., Piossasco (IT)

( * ) Notice: Subject to any disclaimer, the term of this patent is extended or adjusted under 35 U.S.C. 154(b) by 740 days.

(21) Appl. No.: 17/757,442

(22) PCT Filed: Dec. 15, 2020

(86) PCT No.: PCT/IB2020/061953

§ 371 (c)(1),
(2) Date: Jun. 15, 2022

(87) PCT Pub. No.: WO2021/124092

PCT Pub. Date: Jun. 24, 2021

(65) Prior Publication Data

US 2023/0018879 A1 Jan. 19, 2023

(30) Foreign Application Priority Data

Dec. 16, 2019 (IT) ........................ 102019000024147

(51) Int. Cl.
B60T 17/22 (2006.01)
B60T 1/10 (2006.01)
(Continued)

(52) U.S. Cl.
CPC .................. B61H 9/06 (2013.01); B60T 1/10 (2013.01); B60T 13/06 (2013.01); B60T 13/746 (2013.01);
(Continued)

(58) Field of Classification Search
CPC ... B61H 9/06; B60T 1/10; B60T 13/06; B60T 13/746; B60T 17/228; B60T 2270/414
(Continued)

(56) References Cited

U.S. PATENT DOCUMENTS 4,232,768 A * 11/1980 Dufresne ................. B66D 5/08
188/106 P
4,944,372 A * 7/1990 Taig ........................ F16D 65/28
188/72.1
(Continued)

FOREIGN PATENT DOCUMENTS

CN 108507805 A 9/2018
EP 0334434 A2 9/1989
(Continued)

OTHER PUBLICATIONS

ISA European Patent Office, International Search Report Issued in Application No. PCT/IB2020/061953, Mar. 22, 2021, WIPO, 3 pages.
(Continued)

*Primary Examiner* — Christopher P Schwartz
(74) *Attorney, Agent, or Firm* — K&L Gates LLP

(57) ABSTRACT

An electromechanical assembly for a braking system of a railway vehicle is described, characterized in that it comprises a flywheel arranged to accumulate kinetic energy; wherein the kinetic energy accumulated in the flywheel is sufficient to operate the electromechanical assembly to cause the braking system to perform at least one emergency or service or parking brake action. Also described are a control
(Continued)

system for an electromechanical assembly for a braking system of a railway vehicle and a braking system for a railway vehicle.

20 Claims, 8 Drawing Sheets

(51) Int. Cl.
  *B60T 13/06* (2006.01)
  *B60T 13/74* (2006.01)
  *B61H 9/06* (2006.01)
(52) U.S. Cl.
  CPC ....... *B60T 17/228* (2013.01); *B60T 2270/414* (2013.01)
(58) Field of Classification Search
  USPC .... 188/72.1, 72.2, 72.3, 151, 156, 157, 162, 188/166
  See application file for complete search history.

(56) References Cited

U.S. PATENT DOCUMENTS

| 4,953,669 | A | * | 9/1990 | Severinsson | ............ | F16D 65/18 |
| | | | | | | 188/161 |
| 5,092,432 | A | * | 3/1992 | Taig | ........................ | B60T 13/06 |
| | | | | | | 188/72.3 |
| 6,851,535 | B2 | * | 2/2005 | Nakaba | ................. | F16D 27/115 |
| | | | | | | 192/84.5 |
| 10,207,692 | B2 | * | 2/2019 | Persson | ................. | B60T 13/741 |
| 10,843,715 | B2 | * | 11/2020 | Pyper | ...................... | B60L 50/30 |
| 2008/0288192 | A1 | | 11/2008 | Kumar et al. | | |
| 2018/0086355 | A1 | * | 3/2018 | Pyper | ........................ | B60T 1/10 |
| 2023/0106350 | A1 | * | 4/2023 | Tione | .................... | B60T 17/228 |
| | | | | | | 701/19 |
| 2023/0382440 | A1 | * | 11/2023 | Utsumi | ............... | F16D 55/2245 |
| 2025/0050845 | A1 | * | 2/2025 | Frea | ...................... | B60T 8/1705 |

FOREIGN PATENT DOCUMENTS

| EP | 3271602 | B1 | 1/2021 |
| JP | H06503152 | A | 4/1994 |
| WO | 2019042841 | A1 | 3/2019 |
| WO | 2019042860 | A1 | 3/2019 |

OTHER PUBLICATIONS

ISA European Patent Office, Written Opinion of the International Searching Authority Issued in Application No. PCT/IB2020/061953, Mar. 22, 2021, WIPO, 7 pages.

* cited by examiner

ELECTROMECHANICAL ASSEMBLY FOR A BRAKING SYSTEM OF A RAILWAY VEHICLE, CONTROL SYSTEM OF THE ELECTROMECHANICAL ASSEMBLY, AND BRAKING SYSTEM INCLUDING THE ELECTROMECHANICAL ASSEMBLY AND THE CONTROL SYSTEM

CROSS-REFERENCE TO RELATED APPLICATIONS

The present application is a U.S. National Phase of International Application No. PCT/IB2020/061953, entitled "ELECTROMECHANICAL ASSEMBLY FOR A BRAKING SYSTEM OF A RAILWAY VEHICLE, CONTROL SYSTEM OF THE ELECTROMECHANICAL ASSEMBLY, AND BRAKING SYSTEM INCLUDING THE ELECTROMECHANICAL ASSEMBLY AND THE CONTROL SYSTEM", and filed on Dec. 15, 2020. International Application No. PCT/IB2020/061953 claims priority to Italian Application No. 102019000024147, entitled "ELECTROMECHANICAL ASSEMBLY FOR A BRAKING SYSTEM OF A RAILWAY VEHICLE, CONTROL SYSTEM OF THE ELECTROMECHANICAL ASSEMBLY, AND BRAKING SYSTEM INCLUDING THE ELECTROMECHANICAL ASSEMBLY AND THE CONTROL SYSTEM", and filed on Dec. 16, 2019. The entire contents of the above-listed applications are hereby incorporated by reference for all purposes.

TECHNICAL FIELD

This invention relates, in general, to the field of railway braking systems. In particular, the invention relates to an electromechanical assembly for a braking system of a railway vehicle, a control system of the electromechanical assembly and a braking system including the electromechanical assembly and the control system.

PRIOR ART

In the rail transportation system, known braking systems use compressed air properly injected into brake cylinders to generate braking force. Compressed air is generated by one or more compressors.

It is known that the technology for producing compressed air has several drawbacks:

- the overall efficiency of a compressor is extremely low, much less than 50%, and represents a huge consumption of irrecoverable energy;
- the compressor is a source of noise, both towards the environment occupied by the passengers and towards the external environment, and requires significant soundproofing measures;
- the compressor is a source of vibrations which are transmitted to the vehicle body, causing further vibrations and noise in the environment occupied by the passengers;
- the compressor, its support frame, and the soundproofing enclosures for passive noise reduction represent a huge mass amounting to several hundred kilograms, constituting further energy inefficiency when calculating the energy necessary to accelerate the railway vehicle;
- the compressor has a relatively frequent, intrusive, and above all costly maintenance cycle.

A compressed air braking system further requires the use of dryers to remove the humidity from the compressed air, which are characterized by a frequent, intrusive, and costly maintenance cycle. In addition, the compressed air braking system requires reservoirs for storing compressed air and pipes for distributing compressed air. Both the tanks and the pipes represent an additional cost, bulk, and weight.

The preferred known alternative solution is represented by the use of electromechanical braked actuators to replace the current compressed air actuators.

An electromechanical braking actuator generally has one or more electric motors integrated in said actuator and of mechanical elements through which the one or more motors perform two primary functions:

- applying and releasing the braking force;
- loading a spring with a sufficient amount of energy to apply at least one autonomous braking in the event of a loss of electrical energy or in the event of a request for emergency braking, this being necessary since the electronic control of one or more motors is not considered sufficiently safe.

For example, the patent EP0334434 "An electro-mechanical brake unit, preferably for a rail vehicle" describes an electromechanical assembly using two electric motors, a first electric charging motor used to keep a spiral spring permanently loaded, a second electric control motor acting on a mechanism capable of extracting a part of the energy stored in the spring, transforming it into a force to be transferred to the levers of the electromechanical assembly to perform a braking. Said mechanism is configured in such a way that, in the absence of electricity to the electric control motor, said mechanism automatically extracts the energy stored in the spiral spring to transform it into braking.

A second example is the document EP3271602 "BRAKE ACTUATOR," wherein the described actuator uses a single electric motor which, depending on the configuration of the associated internal mechanism, may alternatively load a spring wherein is stored the energy necessary to apply at least one emergency braking in the event of an emergency braking request or in the event of a sudden power failure.

Other known documents relating to electromechanical braking systems for railway vehicles disclose systems based on the use of a spring to store the energy necessary for at least one emergency braking in the event of a sudden power failure.

The drawbacks of systems based on the use of a spring concern the impossibility of modulating the force applied by the spring. In effect, when the activation of the spring is requested, it supplies all the accumulated force. This poses a risk to the safety of passengers, since when the spring is activated, they could be subjected to sudden accelerations due to the force provided by the spring which is used for braking the railway vehicle.

Furthermore, the action of the spring may not be adjusted as a function of the actual weight of the railway vehicle, as this weight is variable for example according to the number of passengers.

SUMMARY OF INVENTION

An object of this invention is therefore to provide an electromechanical assembly for braking a railway vehicle which has an energy storage system, usable in case of need, which is less abrupt and safer than known systems.

The aforesaid and other objects and advantages are achieved, according to an aspect of the invention, by an electromechanical assembly for the braking of a railway vehicle having the features defined in claim 1, a control system for an electromechanical assembly for a braking system of a railway vehicle having the features defined in claim 9 and a braking system according to claim 18. Preferred embodiments of the invention are defined in the dependent claims, the content of which is to be understood as an integral part of this description.

BRIEF DESCRIPTION OF THE DRAWINGS

The functional and structural features of some preferred embodiments of an electromechanical assembly for the braking of a railway vehicle, a control system of such an electromechanical assembly and a braking system including said electromechanical assembly and said control system according to the invention shall now be described. Reference is made to the appended drawings, wherein.

DETAILED DESCRIPTION

Figure 1:
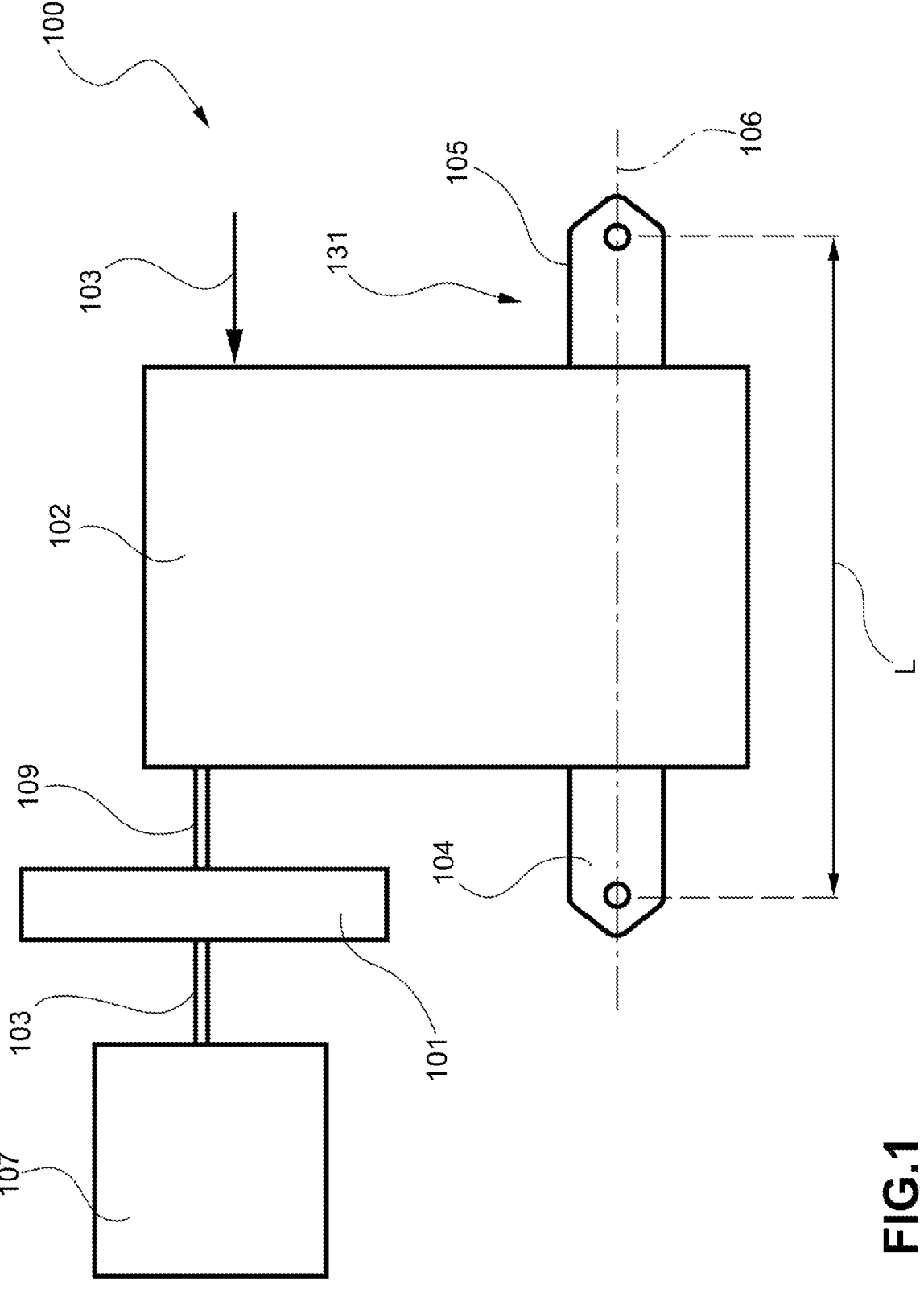
FIG. 1 illustrates an embodiment of an electromechanical assembly for braking a railway vehicle according to this invention.

Before describing in detail a plurality of embodiments of the invention, it should be clarified that the invention is not limited in its application to the construction details and configuration of the components presented in the following description or illustrated in the drawings. The invention is capable of assuming other embodiments and of being implemented or constructed in practice in different ways. It should also be understood that the phraseology and terminology have a descriptive purpose and should not be construed as limiting. The use of "include" and "comprise" and their variations are to be understood as encompassing the elements set out below and their equivalents, as well as additional elements and the equivalents thereof.

In a first embodiment, an electromechanical assembly 100 for a braking system of a railway vehicle comprises a flywheel 101 arranged to accumulate kinetic energy. The kinetic energy stored in the flywheel is sufficient to actuate the electromechanical assembly to cause the braking system to perform at least one emergency or service or parking braking action.

Referring now to FIG. 1, in one embodiment, the electromechanical assembly 100 may further comprise a first electric motor 107, a primary transmission shaft 103 connected rotatably to said first electric motor 107, a secondary transmission shaft 109, a first engagement means 108 arranged to couple rotatably the secondary transmission shaft 109 to the primary transmission shaft 103 and a locking means 111 coupled to the secondary transmission shaft 109. The locking means 111 is arranged to stop the rotation of the secondary transmission shaft 109.

The electromechanical assembly 100 may further comprise a linear actuator 131 capable of extending from a first retracted position, wherein two ends 104, 105 of the linear actuator 131 are at a first distance dis1, to a second extended position, wherein said ends of the linear actuator are at a second distance dis2, greater than the first distance dis1. The linear actuator 131 is arranged to actuate said braking system.

Still further, the electromechanical assembly 100 may comprise a transmission mechanism 133 interposed between the secondary transmission shaft 109 and the linear actuator adapted to convert the rotary motion of the secondary transmission shaft 109 into a linear motion of the linear actuator 131.

In this embodiment the flywheel 101 is connected or connectable rotatably to said primary transmission shaft 103.

The flywheel may be brought to and maintained at a suitable speed by the at least one first electric motor 107 through the primary transmission shaft 103. Preferably, the speed should be such that, associated with the moment of inertia I of the flywheel, it should allow the energy necessary to apply at least one braking to be stored, according to the formula $E=\frac{1}{2}\cdot I\cdot \omega^2$. The linear actuator 131 is controlled by means of one or more electric commands, for example generated by the control unit 720, and, on the basis of said electric commands, may extract the energy accumulated by the flywheel 101 to modify the length L between its ends 104, 105. The ends 104, 105 may, for example, slide horizontally on their axis 106.

Figure 6:
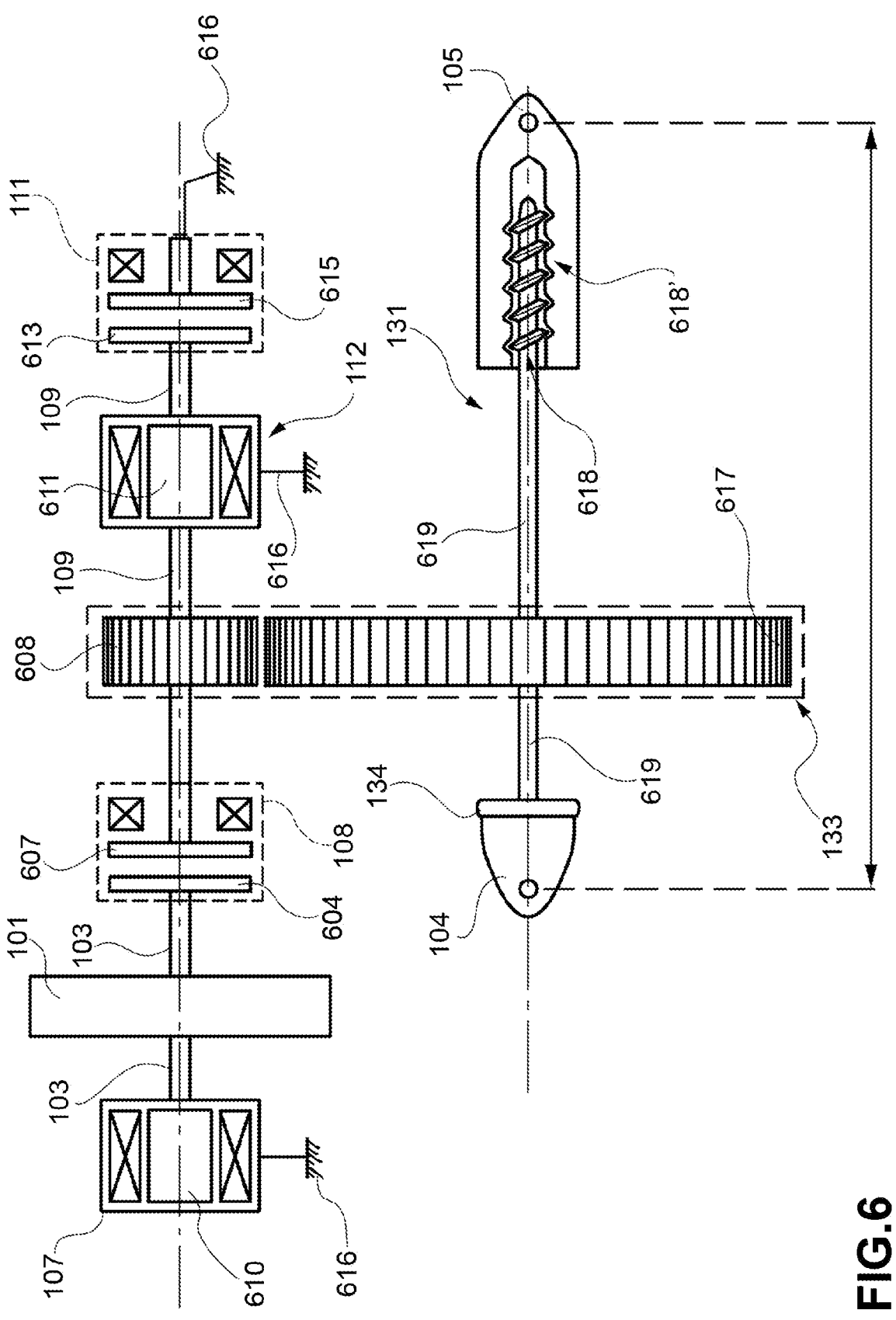
FIG. 6 illustrates a further embodiment of an electromechanical assembly for braking a railway vehicle according to this invention.

As may be seen in FIG. 6, the primary transmission shaft 103 may be connected rotatably directly to the flywheel 101.

Figure 8:
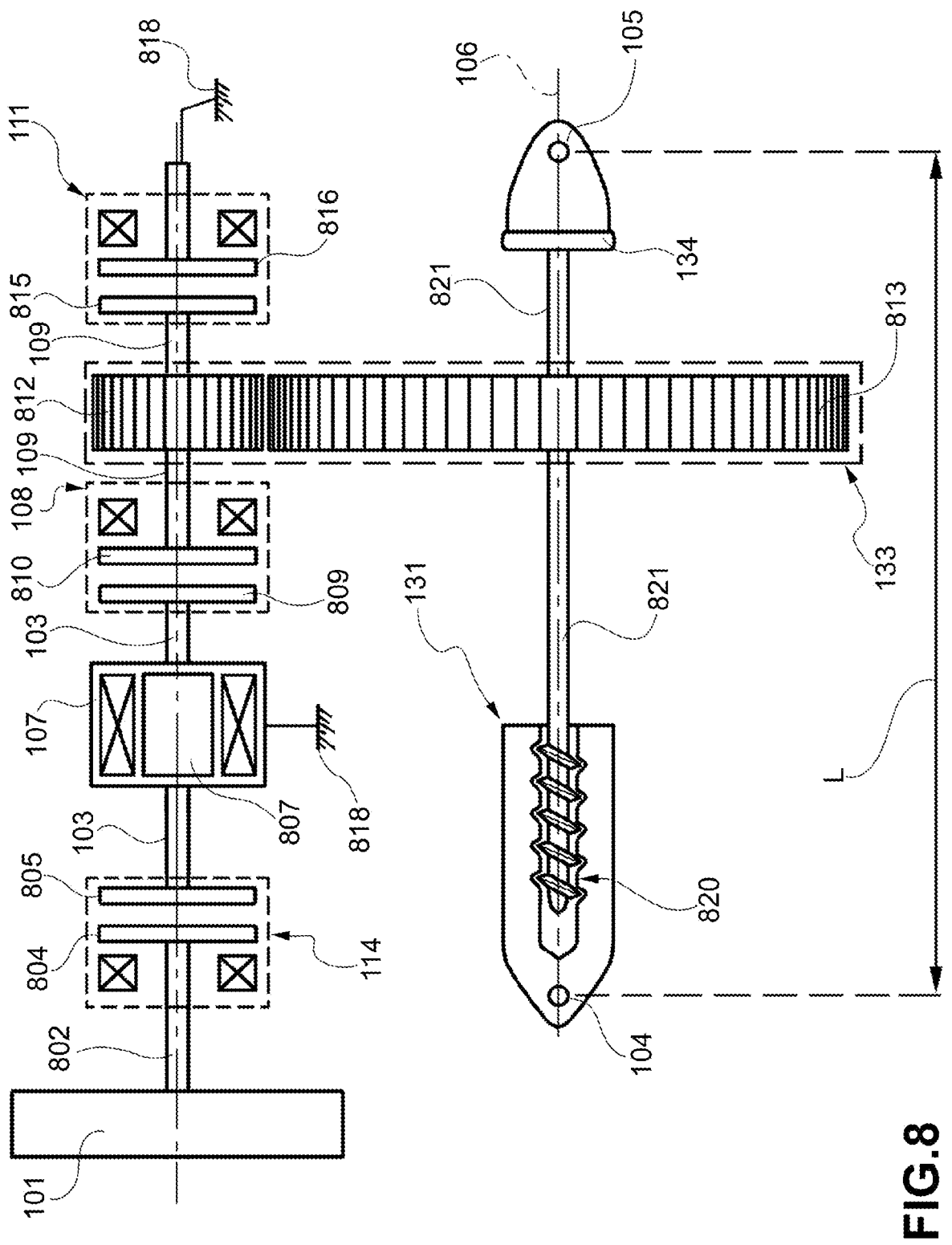
FIG. 8 illustrates a still further embodiment of an electromechanical assembly for braking a railway vehicle according to this invention.

However, as may be seen in FIG. 8, the primary transmission shaft 103 may be connectable rotatably to the flywheel 101 by means of a second engagement means 114.

In any event, the first engagement means 108 may be an electromechanical or electromagnetic clutch. When present, also the second engagement means 114 may be an electromechanical or electromagnetic clutch.

The locking means 111, illustrated in FIGS. 6 and 8 may be an electromechanical or electromagnetic brake.

In an embodiment illustrated in FIG. 8, the primary transmission shaft 103 may be rotatably connectable to the flywheel 101 by means of the second engagement means 114. In this case, the first electric motor 107 may be arranged for:

causing the primary transmission shaft 103 to rotate in a first direction d1, the rotation of the primary transmission shaft 103 in the first direction d1 causing an increase in the distance between the two ends of the linear actuator; and causing the primary transmission shaft 103 to rotate in a second direction d2, opposite to said first direction d1, the rotation of the primary transmission shaft 103 in the second direction d2 causing a decrease in the distance between the two ends of the linear actuator.

As the first electric motor 107 rotates the primary transmission shaft 103 in a second direction d2, the second engagement means 114 disconnects the primary transmission shaft 103 from the flywheel 101. In this way, the kinetic energy accumulated in the flywheel 101 will not be discharged by the rotation of the primary transmission shaft 103.

In a further embodiment illustrated in FIG. 6, wherein the second engagement means 114 is not necessary, the first electric motor 107 is arranged to rotate the primary transmission shaft 103 in a first direction d1, the rotation of the primary transmission shaft 103 in the first direction causing an increase in the distance between the two ends 104, 105 of the linear actuator. In this embodiment, however, the electromechanical assembly 100 comprises a second electric motor 112 coupled to the secondary transmission shaft 109. The second electric motor 112 is arranged to rotate the secondary transmission shaft 109 in a second direction d2, opposite to the first direction d1. The rotation of the secondary transmission shaft 109 in the second direction thus causes a decrease in the distance between the two ends 104, 105 of the linear actuator 131.

In this embodiment, in use, the first electric motor 107 may be kept continuously powered to rotate the primary transmission shaft 103, so as to continuously accumulate kinetic energy in the flywheel 101.

Observing FIGS. 6 and 8, the electromechanical assembly 100 may comprise at least one force sensor means 134 arranged to measure a force applied by the linear actuator 131. The force sensor means 134 may be coupled for example to one of the ends 104, 105 of the linear actuator 131. The force sensor means 134 may be, for example, a sensor of the load cell type, or a sensor of the strain gauge type.

Figure 7:
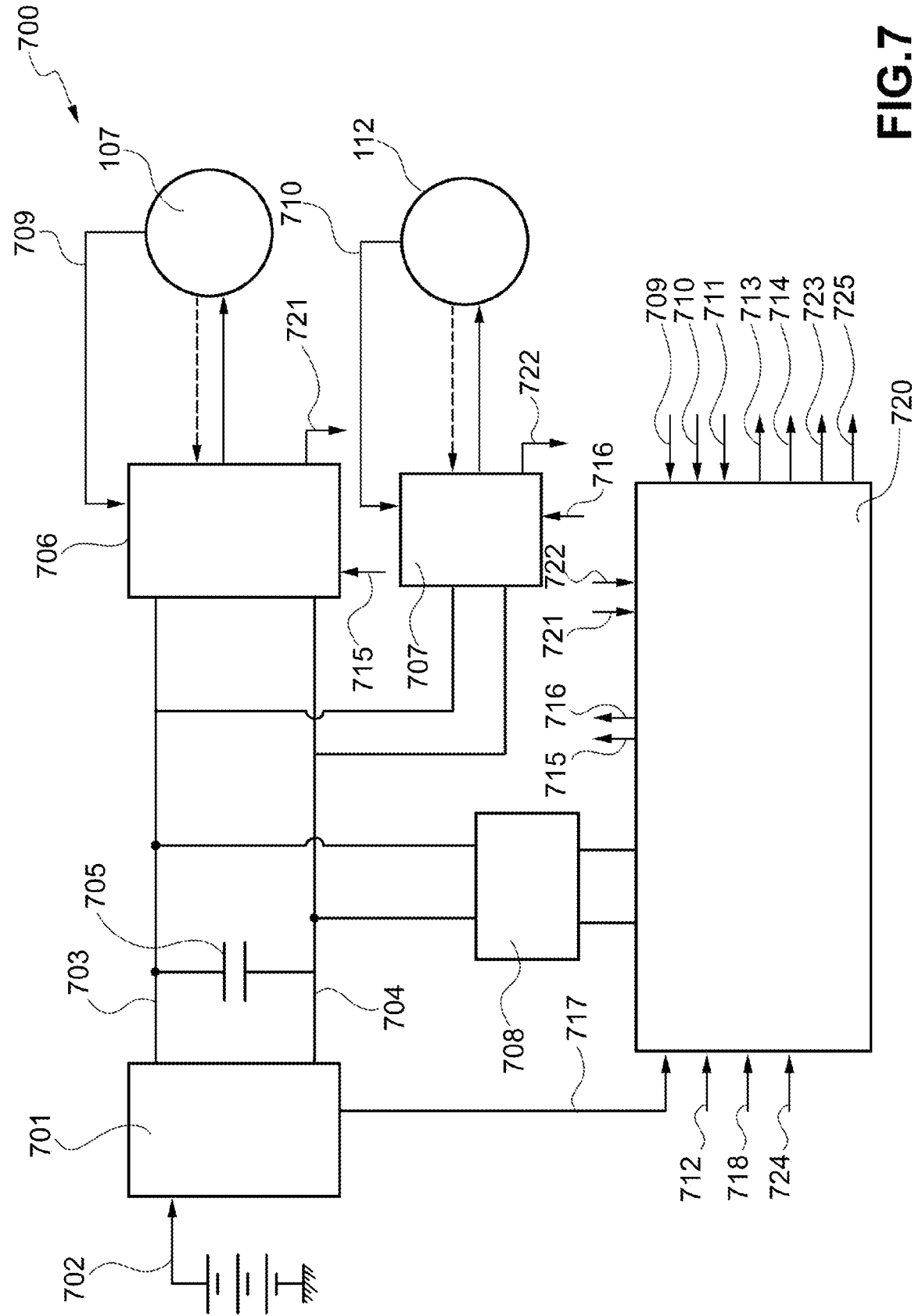
FIG. 7 illustrates a control system for an electromechanical assembly for braking a railway vehicle according to this invention.

Referring now to FIG. 7, this invention further relates to a control system for an electromechanical assembly 100 for a braking system of a railway vehicle according to any of the embodiments described previously.

This control system comprises a control unit 720 arranged to control at least the operation of the first electric motor 107, the first engagement means 108 and the locking means 111.

The control system further comprises power supply means 701 connected at the input to an electric power supply source 702 and arranged to supply a stabilized voltage at the output, and first electric power converter means 706 connected to the first electric motor 107 and adapted to supply energy to said first electric motor for conversion of the stabilized voltage present at the output of the power supply means 701.

The first electric power converter means 706 are further adapted to supply a stabilized voltage by converting a variable voltage generated by said at least first electric motor 107 when rotated by the flywheel.

Moreover, the control system further comprises means 708 for controlling the power supply of said one control unit 720, adapted to supply energy to at least said control unit 720 starting from the stabilized voltage present at the output of the power supply means 701 or from the stabilized voltage supplied by the first electric power converter means 706.

When the electromechanical assembly 100 is made according to an embodiment which comprises not only a first electric motor 107 but also a second electric motor 112, the control system may comprise second electric power converter means 707 connected to the second electric motor 112. The second electric power converter means 707 are adapted to supply energy to the second electric motor 112 by converting the stabilized voltage present at the output to the power supply means 701. The second electric power converter means 707 are further adapted to supply a stabilized voltage by conversion of a variable voltage generated by the second electric motor 112 when rotated by the flywheel 101.

The control means 708 of the power supply of said one control unit 720 may be adapted to supply energy to at least said control unit 720 from the stabilized voltage present at the output of said power supply means 701 or from the stabilized voltage supplied by the first electric power converter means 706 or from the stabilized voltage supplied by the second electric power converter means 707.

With reference to the embodiment referred to in FIG. 6, wherein the two electric motors are provided, the control unit 720 may be arranged to receive a braking force request signal 712. When the braking force request signal 712 indicates a force increase request to both ends of the linear actuator, the control unit 720 is arranged for:

deactivating the locking means 111 coupled to the secondary transmission shaft 109;

coupling rotatably the secondary transmission shaft 109 to the primary transmission shaft 103, through the first engagement means 108.

In this way, a rotation to the primary transmission shaft 103 may be generated by at least the kinetic energy accumulated by the flywheel 101. The rotation of the primary transmission shaft 103 may be transmitted to the secondary transmission shaft 109, thereby changing the distance between the two ends of the linear actuator and decreasing the force at the ends of the linear actuator 131.

Still referring to the embodiment referred to in FIG. 6, wherein the two electric motors are provided, when the braking force request signal 712 indicates a force decrease request to the two ends of the linear actuator, the control unit 720 may be arranged for:

deactivating the locking means 111 coupled to the secondary transmission shaft 109;

decoupling rotatably the secondary transmission shaft 109 from the primary transmission shaft 103, through the first engagement means 108;

activating the second electric motor 112 so as to rotate the secondary transmission shaft 109 in a second direction of rotation of the shaft, opposite to said first direction of rotation of the shaft.

The rotation to the secondary transmission shaft may thus be generated by the second electric motor 112, thereby modifying the distance between the two ends of the linear actuator and decreasing the force at the ends of the linear actuator 131.

Still referring to the embodiment referred to in FIG. 6, wherein the two electric motors are provided, when the control unit 720 detects a power supply anomaly from the electrical power source 702, the rotation to the primary transmission shaft 103, generated by the kinetic energy accumulated by the flywheel, may be transmitted to the first electric motor 107. The kinetic energy transmitted by the flywheel may be converted into electrical energy by the control system, the converted electrical energy being used by the control system for powering the control unit 720 of the control system.

Referring to the embodiment referred to in FIG. 8, wherein there is only one electric motor, the control unit 720 may be again arranged to receive a braking force request signal 712.

When the braking force request signal 712 indicates a force increase request to both ends of the linear actuator, the control unit 720 may be arranged for:

deactivating the locking means 111 coupled to the secondary transmission shaft 109;

coupling rotatably the secondary transmission shaft 109 to the primary transmission shaft 103, through the first engagement means 108;

coupling the flywheel 101 rotatably to the primary transmission shaft 103, through the second engagement means 114.

In this way, a rotation to the primary transmission shaft 103 may be generated by at least the kinetic energy accumulated by the flywheel 101. The rotation of the primary transmission shaft 103 may be transmitted to the secondary transmission shaft 109, thereby changing the distance between the two ends of the linear actuator and decreasing the force at the ends of the linear actuator 131.

Still referring to the embodiment referred to in FIG. 8, wherein there is provided only one electric motor, when a decrease in force is required at the two ends of the linear actuator, the control unit 720 may be arranged for:

deactivating the locking means 111 coupled to the secondary transmission shaft 109;

coupling rotatably the secondary transmission shaft 109 from the primary transmission shaft 103, through the first engagement means 108;

uncoupling rotatably the primary transmission shaft 103 from the flywheel 101, by means of the second engagement means 114;

activating the first electric motor 107 so as to rotate the primary transmission shaft 103 in a second direction of rotation of the shaft, opposite to said first direction of rotation of the shaft.

The rotation of the secondary transmission shaft 109 generated by the first electric motor 107 may change the distance between the two ends of the linear actuator so as to decrease the force at the ends of the linear actuator 131.

Referring again to the embodiment referred to in FIG. 8, wherein there is provided only one electric motor, when the control unit 720 detects a power failure in the electrical power supply source 702, the control unit 720 may be arranged for:

uncoupling rotatably the secondary transmission shaft 109 from the primary transmission shaft 103 via the first engagement means 108;

coupling rotatably the flywheel 101 to the primary transmission shaft 103, via the second engagement means 114.

The rotation to the primary transmission shaft 103, generated by the kinetic energy accumulated by the flywheel, may then be transmitted to the first electric motor 107. The kinetic energy transmitted by the flywheel may thus be converted into electrical energy by the control system. The converted electrical energy may then be used by the control system to power the control unit of the control system.

Referring to both the embodiment of FIG. 6 and the embodiment of FIG. 8, when the braking force request signal 712 indicates a force maintenance request to the two ends of the linear actuator, the control unit 720 may be arranged for:

decoupling rotatably the secondary transmission shaft 109 from the primary transmission shaft 103, by disconnecting the first engagement means 108;

activating the locking means 111 coupled to the secondary transmission shaft 109, so as to stop the rotation of the secondary transmission shaft 109 and to keep the distance between the two ends of the linear actuator 131 constant and to keep the force at the ends of the linear actuator 131 constant.

Referring now to FIGS. 2, 3, 4*a* and 4*b*, this invention further relates to a braking system 200 for a railway vehicle, the braking system 200 including an electromechanical assembly 100 for braking a railway vehicle according to any of the embodiments described above, a control system according to any of the embodiments described above, and braking means 204, 205 arranged to apply a braking force, directly or indirectly, to at least one wheel of the railway vehicle. The application of the braking force is controlled by the motion from the linear actuator.

Figure 2:
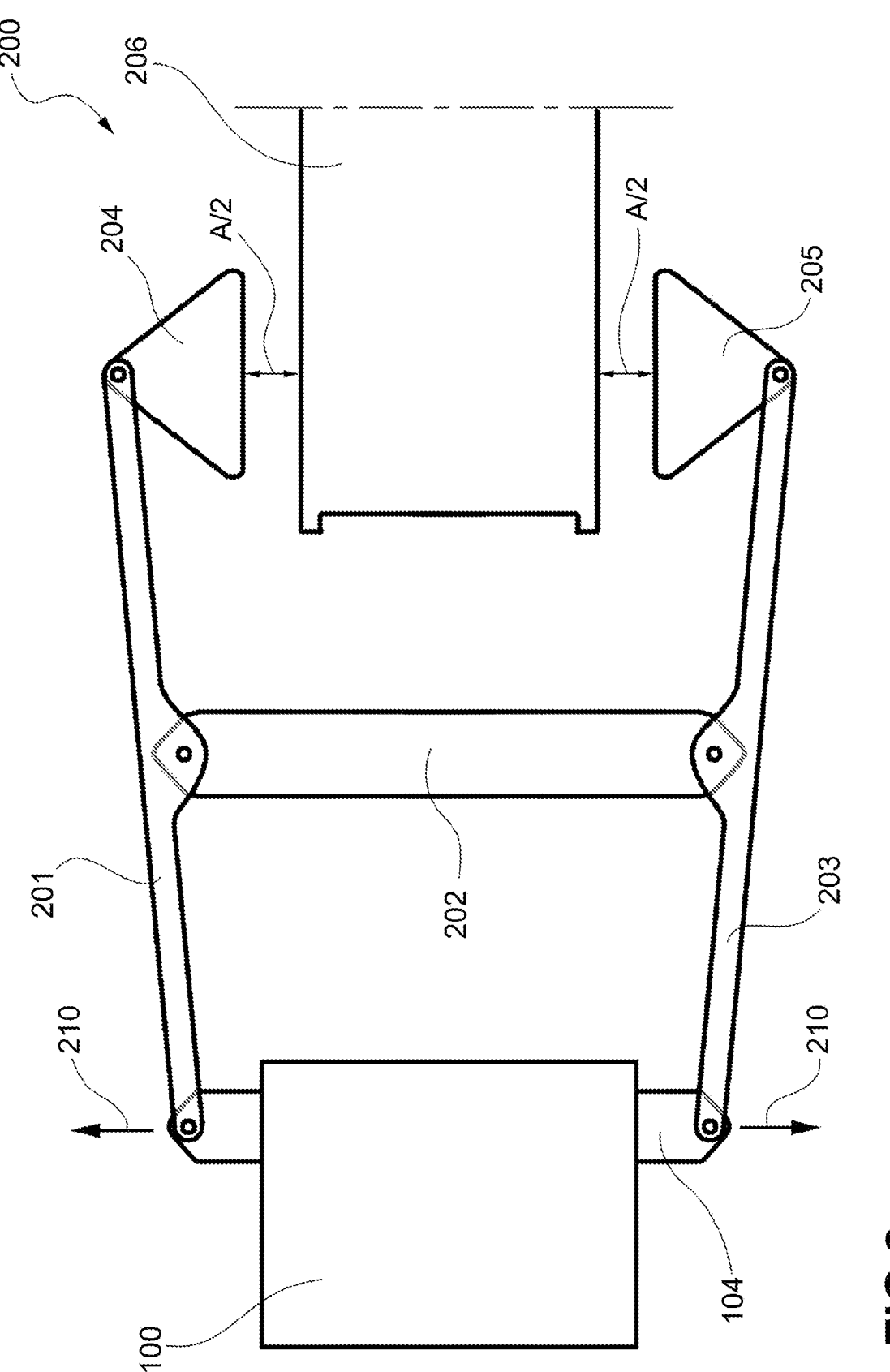
FIG. 2 illustrates the application of the electromechanical assembly of FIG. 1 in a first example of a braking system of a railway vehicle.

As may be seen in FIG. 2, the braking system 200 may comprise a lever system 203 interposed between the linear actuator 131 and the braking means. The lever system 203 may be connected to the two ends of the linear actuator 131 and control the braking force applicable to the wheel of the railway vehicle as a function of the distance between the two ends of the linear actuator.

According to a first example of integration, in FIG. 2, the electromechanical assembly 100 is inserted inside a classic system of levers 201,202,203 which, by expanding the ends 104, 105 of the linear actuator in the directions 210, push the braking means, for example comprising pad holders and the relevant brake pads 204, 205, towards a brake disc 206, exerting a braking force on the brake disc 206.

Observing FIG. 2, the braking force applied by the braking means may increase as the distance between the two ends 104, 105 of the linear actuator 131 decreases and may decrease as the distance between the two ends 104, 105 of the linear actuator 131 increases.

Figure 3:
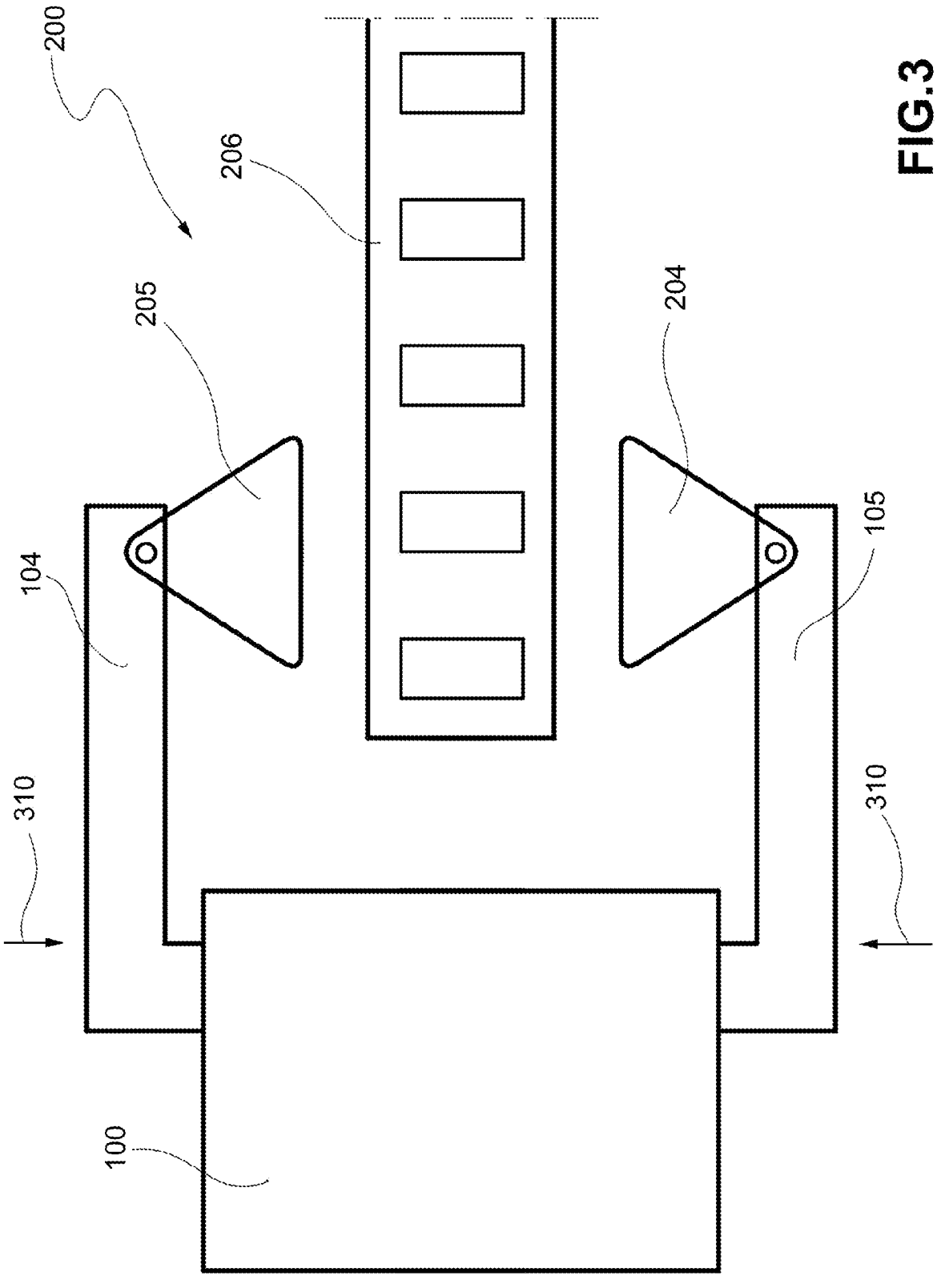
FIG. 3 illustrates the application of the electromechanical assembly of FIG. 1 in a second example of a braking system of a railway vehicle.

According to a second example of integration, in FIG. 3 the electromechanical assembly 100 is inserted inside a brake caliper, where the ends 104, 105, moving in the direction 310, act directly on the pad holders and relevant brake pads 204, 205, causing them to exert the braking force on the brake disc 206. Observing said FIG. 3, the braking force applied by the braking means may decrease as the distance between the two ends 104, 105 of the linear actuator 131 decreases and may increase as the distance between the two ends 104, 105 of the linear actuator 131 increases.

Figures 4A, 4B:
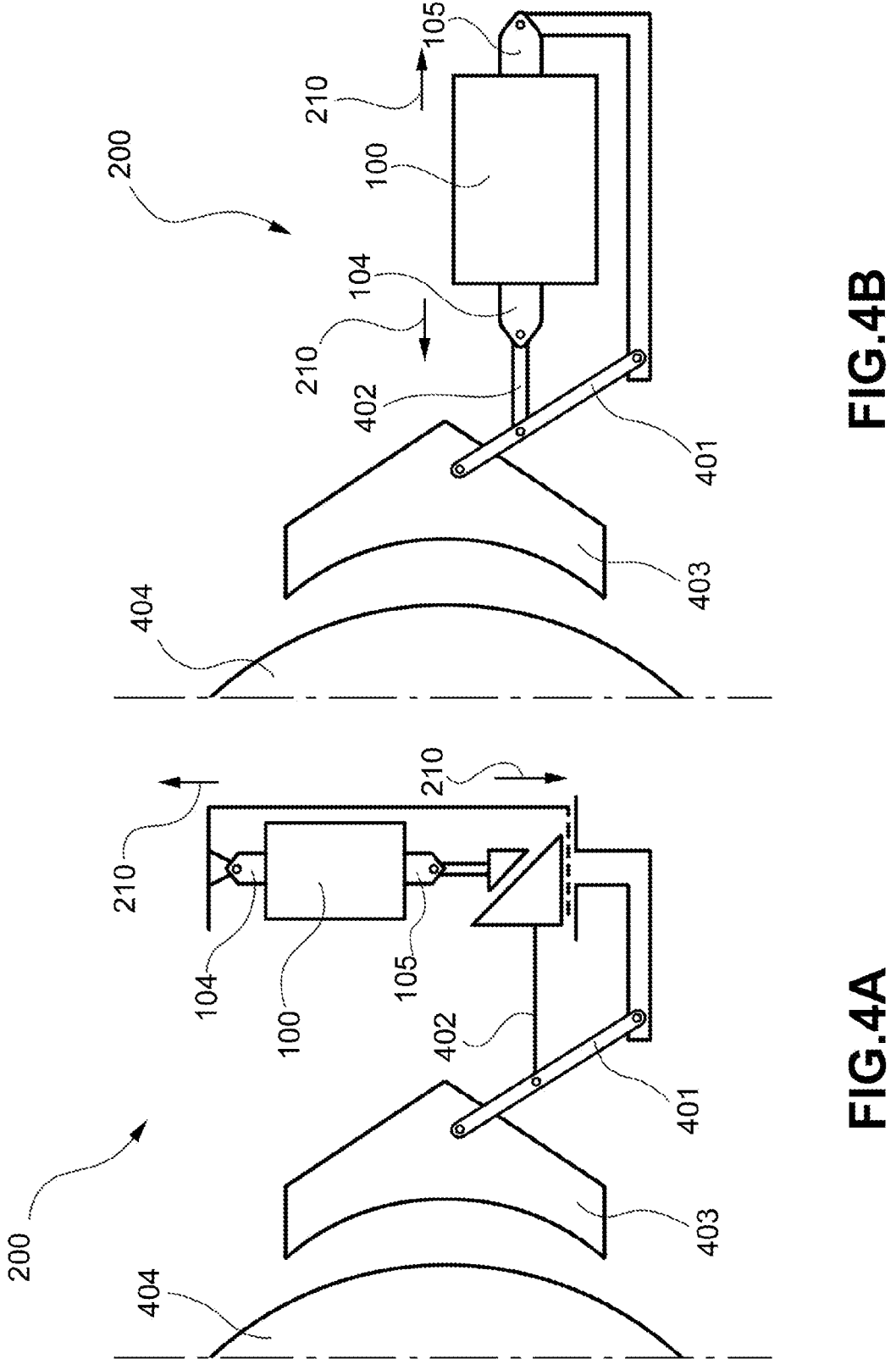
FIG. 4A illustrates the application of the electromechanical assembly of FIG. 1 in a third example of a braking system of a railway vehicle.
FIG. 4B illustrates the application of the electromechanical assembly of FIG. 1 in a fourth example of a braking system of a railway vehicle.

According to a third example of integration, in FIGS. 4A-B, the electromechanical assembly 100 is inserted into a classic system of levers 401, 402, constituting a mechanism of the braking system known as TBU (tread brake unit), which, by expansion of the ends 104, 105 of the linear actuator in the directions 210, push the shoe holder and relevant brake shoe 403, exerting a braking force on the wheel 404.

Further descriptions and practical examples of use of the electromechanical assembly, of the control system of said electromechanical assembly and of the braking system comprising the electromechanical assembly and the control system thereof are reported hereinafter.

Figure 5:
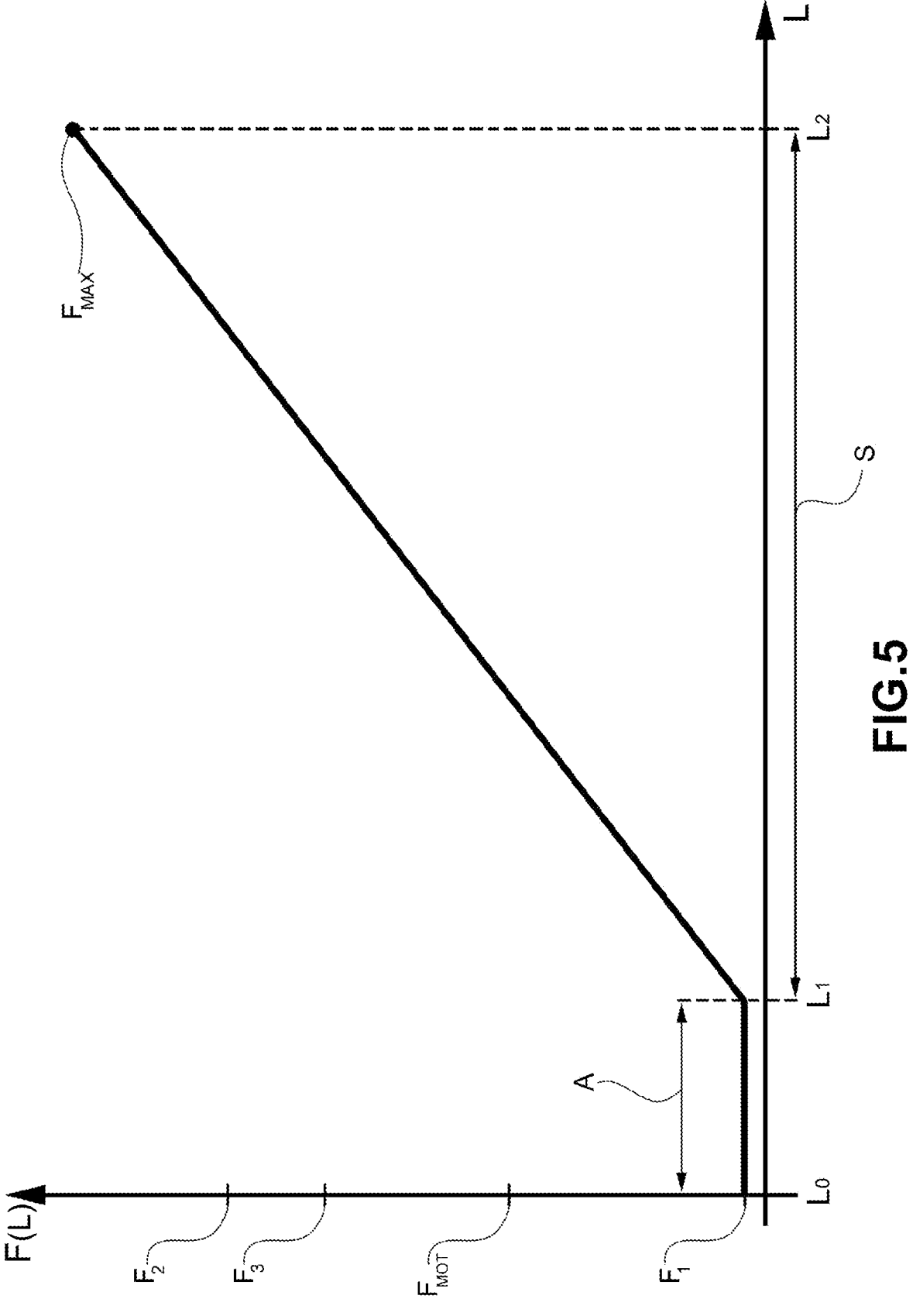
FIG. 5 is a graph illustrating the trend of a force that the ends of the linear actuator of the electromechanical assembly must exert as the distance between them varies.

FIG. 5 illustrates the trend of the braking forces that the ends 104, 105 of the linear actuator 131 must exert as the distance L between them varies, for example with reference to the example of the configuration illustrated in FIG. 2. The distance L has an initial value L0, corresponding to the rest state of the electromechanical assembly 100. In this condition, the brake pads 204, 205 are each positioned at a distance A/2 from the brake disc 206. To bring the brake pads 204, 205 closer to the brake disc 206, or to travel the distance A between L0 and L1, a minimum force F1 is required to overcome the force of the springs suitable to keep the brake pads 204, 205 away from the brake discs 206 in the state of rest.

Subsequently, the increase in the force applied to the ends 104, 105 of the linear actuator causes a flexure S of the levers 201, 203 made possible by their resilience, up to a maximum value of L=L2, corresponding to a force Fmax.

Exemplifying, non-exclusive values, characteristic of pneumatic braking actuators are A=3 mm, S=4 mm, F1=1 KN, FMAX=80 KN. The time of application of the maximum force Fmax may have minimum times of 1 s.

If, to make an electromechanical assembly 100 having characteristic values as reported above, an electric motor is used to apply the force F(L), said motor should supply the ends 104, 105 of the linear actuator 131, directly or through reducers, with a peak force of 80 KN at a speed of 4 mm in 1 s, around the limit of L2.

Being the power P[W]=F[N]*V[m/s], said motor should have, at the peak force Fmax, an available power Pmax=80 KN·0.004 m/1 S=320 W, net of all frictions and inefficiencies of the mechanisms in 102.

The size of a brushless motor having this power is such as to make it unsuitable for this application.

The energy required for an electromechanical assembly according to this invention, having the features described above, to apply a braking cycle, corresponds to the area of the triangle having vertices L1, L2, Fmax, that is E[J]=0.004 m*80000 N/2=160 J.

The value 160 J may be provided for example by a motor capable of delivering 80 W for a time of 2 S.

Referring to FIG. 1, adopting, purely by way of example, an electric motor 107 of an industrial type of 80 W and 6000 RPM, and a brass flywheel 101 (density 8.73) with a radius of 50 mm and height 50 mm, i.e. with inertia 1=4.3E$^{-3}$ kg·m$^2$, about 850 J may be stored, which is five times the energy required to apply a braking.

Keeping the margin of stored energy large has several advantages.

A first advantage is represented in that, in the event of unexpected failure of the first electric motor 107 during a first braking, sufficient energy remains available for at least a second braking. Therefore, in the event of a simultaneous power failure to all the vehicle braking units, by adopting strategies described below, there remains a certain possibility of applying an emergency braking capable of stopping the vehicle safely.

A second advantage is represented in that, in the event of a simultaneous power failure to all the braking units of the vehicle, the first electric motor 107 may be used as a generator, converting part of the kinetic energy accumulated in the flywheel 101 into electrical energy to be returned to the microprocessor control system, not shown in the figure, the consumption of which generally does not exceed ten watts, or 10 J/s, said electrical energy being necessary for the microprocessor control system to complete the emergency braking.

A third advantage is represented in that, following a braking application, should the first electric motor 107 lose power in the meantime, the rotation speed would be reduced only by 10%, and therefore a subsequent emergency braking would take place with application times reduced by 10%, which is normally tolerable.

The size of an industrial motor capable of delivering for example 80 W at 6000 RPM is extremely small and, associated with the size of the flywheel previously described, is in any event much smaller than those of the 320 W motor necessary for a direct application.

Obviously, the power and size of the first electric motor 107 may be further reduced if the acceleration times of the flywheel 101 are lengthened, i.e. the mission profile of the vehicle demonstrates that the average times between two complete brakings are much higher than the acceleration time by design. In the same way, the flywheel mass may be reduced, keeping the same stored energy, increasing the rotation speed. The energy equation is advantageous, whereby the moment of inertia of the flywheel may be reduced by four times by doubling the rotation speed.

A generic advantage of the solution based on the accumulation of kinetic energy is represented in that, while in the case of a direct motor an extremely high peak power must be delivered, at the cost of high peak currents, the accumulation system, once at steady state, requires only the power necessary to keep the flywheel 101 at steady state speed, i.e. the power necessary to overcome the friction of the bearings, and possibly to restore the energy used for a braking, an action that is mediated in time. In this case the currents involved are much lower than using a direct motor, reducing the losses due to dissipation, and requiring conductors with a smaller diameter.

An example of use based on the embodiment illustrated in FIG. 6, previously described, of the electromechanical braking actuator 100 is provided below.

The primary transmission shaft 103 connects the rotor 610 of the first electric motor 107, a flywheel 101 and a first engagement means 108.

Considering the first engagement means to be an electromechanical clutch, a first rotating member 604 is included connected to the first primary transmission shaft.

The secondary transmission shaft 109 connects the first engagement means 108, in particular a second rotating element 607 of the first engagement means 108, the transmission mechanism 133, a rotor 611 of the second electric motor 112, and the locking means 111. The locking means 111 may be an electromechanical brake and include a rotary member 613 coupled to the secondary transmission shaft 109. The transmission mechanism 133 may include a first element 608 which performs the input element function of a mechanical speed reducer.

A body of the first electric motor 107, a body of the second electric motor 112, a second element 615 of the electromechanical brake are mechanically constrained to a body of the electromechanical assembly 100, shown in FIG. 6 with the mechanical mass symbol 616.

The first engagement means 108, i.e. the electromechanical clutch, and the locking means 111, i.e. the electromechanical brake, may for example but not exclusively be of the electromagnetic type.

An electromechanical clutch is a known industrial component, having two functional states. In a first state, the rotating elements 604 and 607 are coupled together, in this way the primary transmission shaft 103 and the secondary transmission shaft 109 are mechanically constrained so that the flywheel 101 may transfer the accumulated kinetic energy to the elements constrained to the primary transmission shaft 103. In a second state the rotating elements 604 and 607 are decoupled from each other, in this way the primary transmission shaft 103 and the secondary transmission shaft 109 are released mechanically, allowing the flywheel 101 to be brought back to the steady-state speed of rotation by the first electric motor 107. The illustration of the first engagement means 108, i.e. the clutch, in FIG. 6 is purely functional, in reality it may take various forms while maintaining the described functionality unchanged.

An electromechanical brake is a known industrial component having two functional states. In a first state the rotating element 613 and the fixed element 615 are coupled together, in this way the secondary transmission shaft 109 is mechanically constrained to the body 616 of the electromechanical assembly 100 and prevented from rotating. In a second state the rotating element 613 and the fixed element 615 are decoupled from each other, allowing the secondary transmission shaft 109 to rotate freely, under energy transfer by the second electric motor 112, or by the flywheel 101 if the first engagement means 108, i.e. the electromechanical clutch, couples the primary transmission shaft 103 and the secondary transmission shaft 109 together. The illustration of the fixing means 111, i.e. of the electromechanical brake, in FIG. 6 is purely functional, in reality it may take various forms while keeping the described functionality unchanged.

A second output element 617 of the transmission mechanism 133, e.g. mechanical speed reducer, may be connected to the linear actuator 131 by means of a third transmission shaft 619. The linear actuator 131 may include a screw 618, a screw 618 and nut screw 618' system. The rotation of the third transmission shaft 119 causes the variation of the distance L between the ends 104, 105 of the linear actuator 131.

The force sensor means 134 may be placed on the mechanical path between the ends 104 and 105 of the linear actuator, in order to be able to measure the force F(L) applied by the linear actuator 131 as the distance L between the ends 104, 105 varies.

An example of use based on a control system 700 for an electromechanical assembly according to the invention is reported below.

Power supply means 701, e.g. a power supply, supplied by an electrical power source 702, typically the vehicle battery, provides a stabilized power voltage between the conductors 703, 704.

The power converting means 706, 707 are connected to the conductors 703, 704 assigned to the power supply of the first electric motor 107 and the second electric motor 112, respectively.

The control means 708 of the power supply of said control unit 720 are further connected to the conductors 703, 704.

The power converter means 706, 707 may be, for example but not exclusively, three-phase inverters.

The first electric motor and the second electric motor 107, 112 may be, for example but not exclusively, brushless motors.

An energy storage device 705 may be coupled to the conductors 703, 704, in order to perform a temporary storage function for the electrical energy possibly regenerated by the first electric motor 107 and/or by the second electric motor 112 through the power converter means 706, 707.

The first electric motor 107 and/or the second electric motor 112 may generate respectively at least one angular position signal 709, 710 arranged to be received respectively by the power converting means 706, 707, and both to the control unit 720. It is known in the art that a motor control system developed according to the state of the art is able to obtain the angular velocity information of a motor from its angular position variation information over time.

The control unit 720 may further receive a force signal 711 from the force sensor means 134, a braking force request signal 712, indicative of a braking force requested from the electromechanical assembly 100, an emergency braking request signal 724, a weight signal 718 indicating the weight bearing on the bogie or body of the railway vehicle to which said electromechanical assembly 100 is associated.

The control unit 720 may generate control signals 713, 714 to activate and deactivate respectively the first engagement means 108, i.e. the electromechanical clutch, and the locking means 111, i.e. the electromechanical brake.

Furthermore, the control unit 720 may generate one or more control signals 715, 716 for power converting means 706, 707, in order to control the speed and/or direction of the first electric motor 107 and/or of the second electric motor 112 respectively, and consequently the direction of the electrical energy towards/from the first electric motor 107 and/or the second electric motor 112.

Below is an example of operation and interaction between the control system 700 and the electromechanical assembly 100.

The electromechanical assembly 100 is initially assumed to be in the rest position, as illustrated in FIG. 2, i.e. in a position with the braking means 204, 205 each at a distance A/2 from the brake disc 206.

When the control system is switched on, the control unit 720 acts on the at least one control signal 715 to bring the first electric motor 107 to a steady-state rotation speed whereby the flywheel 101 will have stored the design kinetic energy, i.e. for example but not exclusively 10 times the energy necessary to apply a complete braking cycle.

Referring to FIG. 5, in the presence of a force request F3 received by the braking force request signal 712, the control unit 720 acts on the control signal 713 to cause the first engagement means 108, i.e. the electromechanical clutch mechanically connects the primary transmission shaft 103 to the secondary transmission shaft 109, and acts on the control signal 714 to cause the locking means 111, i.e. the electromechanical brake, to disconnect the secondary transmission shaft 109 from the body 616 of the electromechanical assembly 100.

In this way, the rotation of the primary transmission shaft 103 transfers the energy accumulated by the flywheel 101 to the secondary transmission shaft 109, with a possible speed reduction factor corresponding to the reduction factor of the transmission mechanism 133, when it acts as a mechanical speed reducer, and with a torque amplification factor corresponding to the inverse of the reduction factor of the transmission mechanism 133.

The distance L between the ends of the linear actuator 131 increases as it travels the length between L0 and L1 without in practice absorbing a significant amount of energy, the product F1 A being negligible with respect to the area of the triangle L2, L2, Fmax.

Having reached the point L1, corresponding to having reset the two distances A/2 of FIG. 2 to zero, the braking means 204, 205, i.e. the brake pads, have reached the surface of the brake disc 206, the force F(L) begins to increase, and its value is reported by the force sensor means 134 to the control unit 720 through the force signal 711.

When the force signal 711 indicates that the force value F3 has been reached within a tolerance band provided for by design, the control unit 720 acts on the control signal 713 to cause the first engagement means 108, i.e. the electromechanical clutch, to disconnect mechanically the primary transmission shaft 103 from the secondary transmission shaft 109, and acts on the control signal 714 to cause the locking means 111, i.e. the electromechanical brake, to connect the secondary transmission shaft 109 to the body 616 of electromechanical assembly 100.

In this way the electromechanical assembly 100 keeps the force value F3 stable until a new request is made to vary the braking force value.

Throughout the phase related to a positive force application, as described thus far, the control unit 720 may make use of the contribution of the first electric motor 112, activating it by means of the control signal 716 to rotate in the same direction as the flywheel 101, simultaneously with the action of coupling the primary transmission shaft 103 to the secondary transmission shaft 109, to provide additional torque to the secondary transmission shaft 109 by reducing the extraction of energy from the flywheel 101, or by increasing the application speed.

In the presence of a force reduction request from F3 to F2 by the braking force request signal 712, the control unit 720 acts on the control signal 714 to cause the locking means 111, i.e. the electromechanical brake, to disconnect the secondary transmission shaft 109 from the body of the electromechanical assembly 100, leaving the secondary transmission shaft 109 free to rotate. Obviously, the primary transmission shaft 103 and the secondary transmission shaft 109 are disconnected from each other via the first engagement means 108.

At the same time as the deactivation of the locking means 111, i.e. of the electromechanical brake, the control unit 720 activates the second electric motor 112 to rotate in the opposite direction to the flywheel 101.

If the force level F3 is higher than the frictional forces of the transmission mechanism and of the linear actuator, i.e. a mechanical chain between the ends 104, 105 and the secondary transmission shaft 109, that is, they form a reversible mechanical chain, said secondary transmission shaft 109 will attempt to rotate independently in the direction opposite to the flywheel 101. In this case, if the rotation speed is higher than the envisaged force release gradient, the secondary electric motor 112 is used by the control unit 720 as a brake, converting the excess kinetic energy into electrical energy which is accumulated in the accumulation element 705.

If the force level F3 is lower than the frictional forces of the transmission mechanism and of the linear actuator, i.e. a mechanical chain between the ends 104, 105 and the secondary transmission shaft 109, that is said mechanical chain is irreversible, the secondary transmission shaft 109 tends to remain stable in the current position thereof. In this case the second electric motor 112 is used by the control unit 720 to start and maintain the rotation of the secondary transmission shaft 109 at a value such as to ensure the release gradient of the requested braking force. The second electric motor 112 must have a minimum torque at least equal to or greater than the static release frictions of the mechanical chain between the ends 104, 105 of the linear actuator 131 and the transmission shaft 606.

When the force signal 711 indicates that the force value F2 has been reached within a tolerance band provided for by design, the control unit 720 acts on the control signal 714 to cause the locking means 111, i.e. the electromechanical brake, to connect the secondary transmission shaft 109 to the body of the assembly 616. At the same time, the control unit 720 deactivates the second electric motor 112. In this way, the electromechanical assembly 100 keeps the force value F2 stable until a new request is made to vary the force value.

In the presence of a force reduction request from F2 to 0 N (zero newton) from the braking force request signal 712, i.e. complete release of the braking force, the control unit 720 behaves exactly as in the previous case, except for the fact that, when the force signal 711 indicates that the force level F=0 N has been reached, it keeps the second electric motor 112 active and keeps the locking means 111, i.e. the electromechanical brake, inactive, and starts measuring the distance variation L corresponding to a variation of angular position measured on the angular position signal 710. When said distance variation L has reached the value A, the control unit 720 acts on the control signal 714 to cause the fixing means 111, i.e. the electromechanical brake, to connect the secondary transmission shaft 109 to the body of the electromechanical assembly 100. At the same time, the control unit 720 deactivates the second electric motor 112. In this way, the electromechanical assembly 100 keeps the position of the braking means, i.e. the pad holders 204, 205, stable at the distance A/2 from the brake disc 206 until a new force value is requested.

It remains constant that during all the steps described above, the control unit 720 may keep the first electric motor 107 permanently active to ensure the quantity of energy stored in the flywheel 101.

In addition to the advantages described above, this invention has the advantage of not requiring a specific device to carry out a parking braking, as instead is claimed in the patent WO2019042860. In effect, by selecting the locking means 111, i.e. the electromechanical brake, of an electromagnetic nature, and of the inverse type, that is, whereby in the absence of electrical energy, said electromechanical brake connects the secondary transmission shaft 109 to the mechanical mass 616 of the electromechanical assembly 100, it is possible to permanently maintain a force previously applied in the subsequent absence of electrical energy, or for example when the vehicle is to be parked for a long time.

As an alternative to the use of the locking means 111, i.e. of the electromechanical brake, in order to maintain a parking braking force indefinitely, it is sufficient to design a mechanical chain which runs between the ends of the linear actuator 104, 105 and the secondary motor 109, i.e. the first input element 608 of the mechanical speed reduction device 609 when provided, so that said mechanical chain is irreversible, i.e. such that for any force value applied from the outside to the ends 104,105 of the linear actuator 131, up to a force value equal to Fmax, it is impossible to impose a reverse rotation on the secondary transmission shaft 109, even in the complete absence of electrical energy.

Should the power supply source 702 fail, the power supply means 701 inform the control unit 720 of the fact by means of the signal 717.

Immediately, the control unit 720 acts on the control signal 715 causing the first electric motor 107 to transform into a controlled generator.

In effect, the first electrical energy converting means 706, as known to those skilled in the art, invert the direction of the currents by absorbing a quantity of energy from the first electric motor 107, that is, by converting part of the kinetic energy accumulated in the flywheel 101 into electrical energy, said quantity of energy being necessary to keep the control unit 720 active. Purely by way of example, it is appropriate to compare the power requested by a generic electronic control unit, on the order of magnitude close to 10 W, and the previously calculated power that may be supplied by the flywheel 101, to understand that the extraction of energy corresponding to 10 W for the time required to carry out a last complete braking is negligible with respect to the mechanical energy still present in the flywheel and necessary for the electromechanical assembly 100 to carry out the last complete braking.

This last solution is extremely advantageous when compared to other solutions, as for example described in the patent WO2019042841.

In the case of the patent WO2019042841 an electrical accumulation system must ensure not only the accumulation of energy necessary to perform a last complete braking, but must also ensure a perfect operation in the temperature ranges prescribed by railway regulations, i.e. −40° C.+85° C., and ensure a life that is compatible with the maintenance cycles achieved by equivalent electro-pneumatic braked systems, i.e. 10 years. Furthermore, it is known to those skilled in the art that, if the accumulation system claimed in the patent WO2019042841 is a battery, it becomes complex to demonstrate with an adequate safety level, typically level SIL4 suitable for emergency braking according to the EN50126, EN50129 standards, the quantity of charge stored inside said accumulation system.

In the case of this invention, the flywheel 101 not only acts both as a facilitator in the application of force by significantly reducing the size of the second electric motor 112, but also acts as a reservoir of kinetic energy that may be converted into electrical energy, to implement a complete final emergency or parking braking. The amount of energy accumulated in the flywheel 101 is easily monitored and certified by the simple measurement of the speed of the flywheel 101 derived from the angular position signal 709 by the control unit 720.

A signal 725 generated by the control unit 720 generates an alarm for systems external to the braking system when the amount of energy stored in the flywheel 101 has reached a minimum safety threshold.

It should be clarified that the storage device 705 absolutely does not require sizing to perform a complete braking, but only to act as a temporary buffer for the electrical energy reconverted by the first electrical power converter means 706 and immediately reused by the control system 700 to manage the final emergency or parking braking.

Should a fault occur in the control unit 720, there is a possibility that the energy stored in the flywheel 101 may be fully transmitted to the secondary transmission shaft 109 through the first engagement means 108, i.e. the electromechanical clutch, with the evident risk of breaking at least one mechanical member in the mechanical chain that goes from the ends 104, 105 of the linear actuator 131 to the flywheel 101. To remedy the case described, it is sufficient to size the friction coefficient of the first engagement means 108, i.e. the electromechanical clutch, such that the corresponding friction force is only slightly higher than the force necessary to apply the maximum braking force Fmax. In this way, the electromechanical clutch acts as a mechanical fuse. It is known to those skilled in the art that commercial electromechanical clutches suitable for performing the function of the electromechanical clutch have a functional life measurable in millions of joules dissipated during the connection and disconnection phases. In the case of this invention, as previously described by way of example, the flywheel 101 accumulates an amount of power on the order of magnitude of a thousand joules. In this case, the electromechanical clutch, while acting as a temporary fuse element, does not suffer damage such as to nullify its subsequent operation.

The presence of a further weight signal 718 at the input of the control unit 720, indicating the weight bearing on the bogie to which the electromechanical assembly is associated, allows the control unit 720 to carry out the procedure for applying a braking in the case of power failure by calculating the force value to be exerted as a function of said value at a weight value provided by the weight signal 718, in order to provide the maximum braking force possible without exceeding the available grip force.

In the previous descriptions relating to the dynamic behavior of the braking system, the assumption has been made to switch the instantaneous state of the engagement means, i.e. of the electromechanical clutch, and of the locking means, i.e. of the electromechanical brake. In reality, the aforementioned devices have physical actuation times, on the order of hundreds of milliseconds, wherein the frictional forces continuously pass from the null value to the nominal operating value. This implies that during simultaneous switching the case may occur wherein the flywheel

101, charged with kinetic energy, for a short time, precisely on the order of magnitude of one hundred milliseconds, comes through the secondary transmission shaft 109 to the mechanical mass 616 of the electromechanical assembly 100.

One solution is represented by preloading in a memory of the control unit 720 the nominal delays of the components, normally supplied by the manufacturers, said nominal delays being used by the control module to suitably command the one or more engagement means, i.e. the electromechanical clutch, and the locking means 111, i.e. the electromechanical brake, avoiding actuation crossings.

In reality, during their functional life, both the electromechanical brake and the electromechanical clutch undergo a progressive consumption of the clutch materials, modifying the mechanical gaps therein, increasing or shortening the reaction times depending on the functional construction of said components.

To remedy this situation, the control unit 720 may receive information on the amplitude and direction of the currents passing from/towards the first electric motor 107 and/or the second electric motor 112 by means of signals 721, 722. These currents are indicative of the torques to which the motors are subject, and thus, for example, to the fact that either the locking means 111, i.e. the electromechanical brake, intervened in a timely manner before or after the event of deactivating the second electric motor 112, or the locking means 111, i.e. the electromechanical brake, intervened before the event of opening the engagement means, i.e. the electromechanical clutch. Furthermore, the activation and deactivation of the electromechanical brake and the electromechanical clutch causes variation of the speeds of the first electric motor 107 and/or of the second electric motor 112.

By correlating the command times to the electromechanical brake and the electromechanical clutch with the current and speed variations of the electric motors, the control unit 720 is able to correct the aforesaid switching times initially preloaded in its non-volatile memory, in the interest of minimizing the mechanical stresses and consumption of the electromechanical brake and electromechanical clutch.

Observing FIG. 5, it may be deduced that there is a force field below Fmot where the second electric motor 112 is able to operate autonomously in the application and release of the required braking force. Fmot depends on the scale of the second electric motor 112 and on the frictional forces of the mechanical chain, which goes from the ends 104, 105 of the linear actuator 131 to the secondary transmission shaft 109.

To further limit mechanical stress and consumption of the electromechanical brake and the electromechanical clutch, when the braking force field is below Fmot, the control unit 720 may activate the electromechanical brake only when the second electric motor 112 has brought its rotation speed to zero, and may activate the electromechanical clutch, i.e. the engagement means 108, only when the rotation speed of the second electric motor 112 has reached the rotation speed of the motor.

An example of use based on the previously described embodiment illustrated in FIG. 8 of the electromechanical braking actuator 100 is reported hereinafter.

A third transmission shaft 802 connects the flywheel 101 and the second engagement means 114, for example the second engagement means 114 is an electromechanical clutch and a first rotating element 804 thereof is connected to said third transmission shaft.

The primary transmission shaft 103 connects the first engagement means 108, for example the first engagement means is an electromechanical clutch and its first rotating element 805 is connected to the primary transmission shaft, to the rotor 807 of the first electric motor 107 and to the second engagement means 114, i.e. to a second rotating element 809 of the second engagement means 114. Note that in this embodiment the first electric motor 107 is the only one provided in the assembly, therefore the second electric motor 112 will not be provided.

The secondary transmission shaft 109 connects a second rotating element 810 of the first engagement means 108, to the drive mechanism 133 and to the locking means 111. When the locking means is an electromechanical brake, the secondary transmission shaft is connected to a rotary member 815 of the electromechanical brake.

The body of the first electric motor 107, and the locking means 111 are mechanically constrained to the body of the electromechanical assembly 100, shown in FIG. 8 with the mechanical mass symbol 818.

The first engagement means 108 and the second engagement means 114, i.e. the electromechanical clutches, and the locking means 111, i.e. the electromechanical brake, may be, for example but not exclusively, of the electromagnetic type.

Analyzing in detail the operation of the second engagement means 114 and considering the example wherein it is an electromechanical clutch, this electromechanical clutch is a known industrial component, having two functional states. In a first state, the rotating elements 804 and 805 are coupled to each other, thus the third transmission shaft 802 and the primary transmission shaft 103 are mechanically constrained so that the flywheel 801 may transfer the accumulated kinetic energy to the primary transmission shaft 103, and the first electric motor 107 may transfer kinetic energy to the flywheel 101. In a second state, the rotating elements 804 and 805 are decoupled from each other. In this way, the third transmission shaft 802 and the primary transmission shaft 103 are mechanically released, allowing the flywheel 101 to rotate freely by its own inertia.

Analyzing in detail the operation of the first engagement means 108 and considering the example wherein it is an electromechanical clutch, this electromechanical clutch is a known industrial component, having two functional states. In a first state, the rotating elements 809 and 810 are coupled to each other, thus the primary transmission shaft 103 and the secondary transmission shaft 109 are mechanically constrained in such a way that the first electric motor 107 and the flywheel 101 may transfer kinetic energy transmission mechanism 133. When the transmission mechanism 133 is a mechanical reducer, the kinetic energy is transferred to the first element 812 of the mechanical speed reducer when the rotating elements 804, 805 of the first electromechanical clutch 803 are coupled.

In a second state the rotating elements 809 and 810 are decoupled from each other; in this way the primary transmission shaft 103 and the secondary transmission shaft 109 are mechanically released, freeing the secondary transmission shaft 109.

The illustration of the electromechanical clutches 108, 114 in FIG. 8 is purely functional. In reality, they may take various forms while keeping the described functionality unchanged.

Analyzing in detail the operation of the locking means 111 and considering the example wherein it is an electromechanical brake, this electromechanical brake is a known industrial component, having two functional states. In a first state the rotating element 815 and the mechanical mass 818 (body of the electromechanical assembly 100) are coupled together; in this way the secondary transmission shaft 109 is mechanically constrained to the body of the electromechanical assembly 100, prevented from rotating. In a second state the rotating element 815 and the mechanical mass 818 (body of the electromechanical assembly 100) are decoupled from each other, allowing the secondary transmission shaft 109 to rotate freely.

The illustration of the electromechanical brake 111 in FIG. 8 is purely functional. In reality, it may take various forms while keeping the described functionality unchanged.

Analyzing the operation of the transmission mechanism 133 in detail and considering the example wherein it is a mechanical reducer, a second element 813 of the mechanical speed reducer is connected to a screw and nut screw system 820 by means of a fourth transmission shaft 821. The rotation of the fourth transmission shaft 821 causes the variation of the distance L between the ends 104, 105 of the linear actuator 131.

The force sensor 134 may be placed for example but not exclusively between the two ends 104 and 105 of the linear actuator 131, in order to measure the force F(L) applied by the electromechanical assembly 100 as the distance L changes.

In FIG. 7, power supply means 701, for example a power supply, is supplied by an electrical power source 702, typically the vehicle battery, and provides a stabilized power supply voltage across the conductors 703, 704.

The first electric power conversion means 706 are connected to the conductors 703, 704, and in this example, they are the only ones since only the first electric motor 107 is provided. The first electric power conversion means 706 are assigned to the power supply of the first electric motor 107.

The control means 708 of the power supply of said control unit 720 are further connected to the conductors 703, 704.

The first electric motor 107 may be, for example but not exclusively, a brushless motor, and the first electric power conversion means 706 may be, for example but not exclusively, a three-phase inverter.

An energy storage device 705 performs the function of accumulator for any electrical energy regenerated by the first electric motor 107 through the first electric power conversion means 706.

The first electric motor 107 generates the angular position signals 709 intended for the first electric power conversion means 706 and the control unit 720, respectively. It is prior art that a motor control system developed according to the state of the art is able to obtain the angular velocity information of a motor from its information on the angular position variation over time.

The control unit 720 further receives the force signal 711 from the force sensor means 134, and the braking force request signal 712, indicating the force requested from the electromechanical assembly.

The control module 720 generates the control signals 713, 723, 714 to activate, deactivate the second engagement means 114, the first engagement means 108, and the locking means 111, respectively.

Moreover, the control unit 720 generates the control signal 715 for the first electric power conversion means 706 in order to control the speed and direction of the first electric motor 107.

The operation and interaction between the control system 700 and the electromechanical assembly 100 are now described.

The electromechanical assembly is initially assumed to be in the rest position according to FIG. 2, that is, with the braking means 204, 205, i.e. the pad holders, each at a distance A/2 from the brake disc 206.

When the control system is switched on, the control unit 720 activates the second engagement means 114 connecting the third transmission shaft 802 to the primary transmission shaft 103, and starts and brings the first electric motor 107 to steady-state speed by means of the control signal 715, said steady-state rotation speed being the speed at which the flywheel 101 will have stored the design kinetic energy, or for example but not exclusively 10 times the energy necessary to apply a complete braking cycle.

Referring to FIG. 5, in the presence of a force request F3 from the braking force request signal 712, the control unit 720 acts on the control signal 713 to cause the second engagement means 114 to mechanically connect the third transmission shaft 802 to the primary transmission shaft 103, acts on the control signal 723 to cause the first engagement means 108 to mechanically connect the primary transmission shaft 103 to the secondary transmission shaft 109 and acts on the control signal 714 to cause the locking means 111 to disconnect the secondary transmission shaft 109 from the body 818 of the electromechanical assembly 800.

Thus, the rotation of the third transmission shaft 802 and of the primary transmission shaft 103 transfers the energy of the flywheel 101 to the secondary transmission shaft 109. The rotation of the secondary transmission shaft 109 may therefore transfer the energy of the flywheel 101 to the fourth secondary transmission shaft 821 with a possible speed reduction factor corresponding to the reduction factor of the transmission mechanism 133, which may act as a mechanical speed reducer, and with a possible torque amplification factor corresponding to the reduction factor of the transmission mechanism 133, i.e. of the mechanical speed reducer.

The distance L between the ends 104, 105 of the linear actuator 131 increases by traveling along the portion between L0 and L1 without in practice absorbing a significant amount of energy, since the product F1·A is negligible with respect to the area of the triangle L2, L2, Fmax.

Having reached the point L1, corresponding to having reset the two distances A/2 of FIG. 2 to zero, the braking means 204, 205, i.e. the pads, have reached the surface of the brake disc 206, the force F(L) begins to increase, and its value is reported by the force sensor 134 to the control unit 720 through the force signal 711.

When the force signal 711 indicates that the force value F3 has been reached within a tolerance band provided for by design, the control unit 720 acts on the control signal 723 to cause the first engagement means 108 to mechanically disconnect the primary transmission shaft 103 from the secondary transmission shaft 109, and acts on the control signal 714 to cause the locking means 111 to connect the secondary transmission shaft 109 to the mechanical mass 818 (body of the electromechanical assembly 100).

In this way the electromechanical assembly 100 keeps the force value F3 stable until a new request is made to vary the force value.

The control unit 720 keeps the second engagement means 114 active so that the first electric motor 107 may continue to keep the flywheel 101 rotatably.

In the presence of a force reduction request from F3 to F2 by the braking force request signal 712, the control unit 720 acts on the control signal 714 to cause the locking means 111 to disconnect the secondary transmission shaft 109 from the mechanical mass 818 (body of the electromechanical assembly 100), making the secondary transmission shaft 109 free to rotate, acts on the control signal 713 to cause the second engagement means 114 to disconnect the third transmission shaft 802 from the primary transmission shaft 103 allowing the first electric motor 107 to rotate at a different speed from the flywheel 101, acts on the control signal 723 to cause the first locking means 108 to connect the primary transmission shaft to the secondary transmission shaft, and activates the first electric motor 107 to rotate in the direction opposite to the flywheel 101.

If the force level F3 is greater than the frictional forces of the mechanical chain from the ends 104, 105 of the linear actuator 131 to the secondary transmission shaft 109, the secondary transmission shaft 109 will attempt to rotate autonomously in the direction opposite to the flywheel 101. In this case, if the rotation speed is higher than the envisaged force release gradient, the first electric motor 107 is used by the control unit 720 as an electromechanical brake, converting the excess kinetic energy into electrical energy that is accumulated in the accumulation element 705.

Should the force level F3 be less than the frictional forces of the mechanical chain from the ends 104, 105 of the linear actuator 131 to the secondary transmission shaft 109, the secondary transmission shaft 109 tends to remain stable in its current position. In this case the first electric motor 107 is used by the module control unit 720 to start and maintain the rotation of the secondary transmission shaft 109 at a value such as to ensure the requested braking force release gradient. The first electric motor 107 must have a minimum torque at least equal to or greater than the static frictions in release of the mechanical chain from the ends 104, 105 of the linear actuator to the secondary transmission shaft 109.

When the force signal 711 indicates that the force value F2 has been reached within a tolerance band provided for by design, the control unit 720 acts on the control signal 723 to cause the first engagement means 108 to disconnect the primary transmission shaft 103 from the secondary transmission shaft 109 and acts on the control signal 714 to cause the locking means 111 to connect the secondary transmission shaft to the body 816 of the electromechanical assembly 100. In this way, the electromechanical assembly 100 keeps the force value F2 stable until a new request is made to change the force value. At the same time, the control unit of control 720 acts on the control signal 713 to cause the second engagement means 114 to connect the third transmission shaft 802 to the primary transmission shaft 103 and acts on the control signal 715 causing the first electric motor 107 to return the flywheel 101 to the steady-state rotation speed, recharging the kinetic energy lost during the braking application.

In the presence of a request for force reduction from F2 to 0 N from the braking force request signal 712, i.e. complete release of the braking force, the control unit 720 behaves exactly as in the previous case, except that, when the force signal 711 indicates that the force level F=0 N has been reached, it keeps the first electric motor 107 active and keeps locking means 111 inactive, starts measuring the variation in distance L corresponding to a variation in angular position measured on the angular position signal 710. When said distance variation L has reached the value A, the control unit 720 acts on the control signal 714 to cause the locking means 111 to connect the secondary transmission shaft to the body of the electromechanical assembly 100. In this way, the electromechanical assembly 100 keeps the position of the braking actuators stable, i.e. of the pad holders 204, 205 at the distance A/2 from the brake disc 206 until a new force value is requested.

The same principles described for the electromechanical assembly described in the previous example are also valid for the electromechanical assembly just described, relative to the methods for applying the parking braking, converting kinetic energy into electrical energy for a final emergency or parking braking, and compensating the switching delays of the two electromechanical clutches 803, 811 and of the electromechanical brake.

The described transmission mechanisms 133 may be obtained, for example, but not exclusively, by means of coupling two or more gears, or by coupling a gear with a worm screw, or with one or more planetary gearboxes in series.

The control unit 720 may contain at least one microprocessor, or at least one programmable circuit of the FPGA or Gate Array or Asic type, or both.

Various aspects and embodiments of an electromechanical assembly, of a control system for such an electromechanical assembly, according to the invention have been described. It is understood that each embodiment may be combined with any other embodiment. Furthermore, the invention is not limited to the described embodiments, but may be varied within the scope defined by the appended claims.

The invention claimed is:

1. An electromechanical assembly for a braking system of a railway vehicle, comprising:
   a flywheel to accumulate an amount of kinetic energy configured to be supplied to the braking system during a braking action of the braking system;
   wherein the amount of kinetic energy accumulated by the flywheel is sufficient for the braking system to execute the braking action; and
   wherein the braking action is an emergency brake action, a service brake action, or a parking brake action.

2. The electromechanical assembly according to claim 1, further comprising:
   a first electric motor;
   a primary transmission shaft connected rotatably to said first electric motor;
   a secondary transmission shaft;
   a first engagement means arranged to couple rotatably the secondary transmission shaft to the primary transmission shaft;
   a locking means coupled to the secondary transmission shaft and arranged to stop a rotation of the secondary transmission shaft;
   a linear actuator extendable from a first retracted position, wherein two ends of the linear actuator are at a first distance, to a second extended position, in which said ends of the linear actuator are located at a second distance, greater than the first distance, said linear actuator being arranged to actuate said braking system; and
   a transmission mechanism, interposed between the secondary transmission shaft and the linear actuator, adapted to convert the rotation of the secondary transmission shaft into a linear motion of the linear actuator;
   wherein the flywheel is connected or connectable rotatably to said primary transmission shaft.

3. The electromechanical assembly according to claim 2, wherein the primary transmission shaft is rotatably connectable to the flywheel by a second engagement means;
   wherein the first electric motor is arranged for:
      rotating the primary transmission shaft in a first direction, the rotation of the primary transmission shaft according to the first direction causing an increase in distance between the two ends of the linear actuator; and rotating the primary transmission shaft in a second direction, opposite to said first direction, the rotation of the primary transmission shaft in the second direction causing a decrease of distance between the two ends of the linear actuator; and
   wherein when the first electric motor rotates the primary transmission shaft in the second direction the second engagement means disconnects the primary transmission shaft from the flywheel.

4. The electromechanical assembly according to claim 3, wherein one or more of the first engagement means and the second engagement means comprise an electromechanical or electromagnetic clutch.

5. The electromechanical assembly according to claim 2, wherein the first electric motor is arranged to rotate the primary transmission shaft according to a first direction, the rotation of the primary transmission shaft in the first direction causing an increase in distance between the two ends of the linear actuator;
   wherein the electromechanical assembly comprises a second electric motor coupled to the secondary transmission shaft;
   wherein the second electric motor is arranged to rotate the secondary transmission shaft in a second direction, opposite to the first direction; and
   wherein the rotation of the secondary transmission shaft in the second direction causes a decrease in distance between the two ends of the linear actuator.

6. The electromechanical assembly according to claim 5, wherein the first electric motor is kept continuously powered, in order to rotate the primary transmission shaft so as to continuously accumulate kinetic energy in the flywheel.

7. The electromechanical assembly according to claim 2, wherein the locking means comprises an electromechanical or electromagnetic brake.

8. The electromechanical assembly according to claim 2, comprising at least one force sensor means arranged to measure a force applied by the linear actuator.

9. A control system for an electromechanical assembly of a braking system, wherein the electromechanical assembly comprises:
   a flywheel arranged to accumulate kinetic energy sufficient to operate the electromechanical assembly for at least one emergency brake action, service brake action, or parking brake action of the braking system; and
   wherein the control system comprises:
      a control unit arranged to control at least actuation of a first electric motor, a first engagement means, and a locking means of the electromechanical assembly, wherein the first engagement means is arranged to couple rotatably a primary transmission shaft, connected rotatably to the first electric motor, to a secondary transmission shaft, and wherein the locking means is coupled to the secondary transmission shaft and arranged to stop a rotation of the secondary transmission shaft;
      power supply means connected at their input to an electrical power source and arranged to output a stabilized voltage;
      first electric power converter means connected to the first electric motor and adapted to supply energy to said first electric motor by conversion of the stabilized voltage present at an output of said power supply means, wherein said first electric power converter means are further adapted to provide a stabilized voltage by conversion of a variable voltage generated by at least the first electric motor when driven rotatably by the flywheel; and control means of the power supply of said control unit, adapted to supply energy to at least said control unit starting from the stabilized voltage present at the output of said power supply means or by the stabilized voltage provided by the first electric power converter means.

10. The control system according to claim 9, wherein the control system further comprises:

second electric power converter means connected to a second electric motor of the electromechanical assembly and adapted to supply energy to said second electric motor by converting the stabilized voltage present at the output to said power supply means, the second electric motor being coupled to the secondary transmission shaft of the electromechanical assembly;

wherein said second electric power converter means are further adapted to provide a stabilized voltage by converting a variable voltage generated by said second electric motor when driven rotatably by the flywheel; and wherein said control means of the power supply of said control unit are adapted to supply energy to at least said control unit starting from the stabilized voltage present at the output at said power supply means or by the stabilized voltage supplied by the first electric power converter means or by the stabilized voltage supplied by the second electric power converter means.

11. The control system according to claim 10, wherein when the control unit detects a power supply anomaly from the electric power source, the rotation to the primary transmission shaft, generated by the kinetic energy accumulated by the flywheel, is transmitted to the first electric motor; and wherein the kinetic energy transmitted by the flywheel being converted into electrical energy by the control system, the converted electrical energy being used by the control system to power the control unit of the control system.

12. The control system according to claim 9, wherein the electromechanical assembly further comprises:

a linear actuator extendable from a first retracted position, wherein two ends of the linear actuator are at a first distance, to a second extended position, in which said ends of the linear actuator are located at a second distance, greater than the first distance, said linear actuator being arranged to actuate said braking system;

wherein the control unit is arranged to receive a braking force request signal;

wherein when the braking force request signal indicates a request for force increase at the two ends of the linear actuator, the control unit is arranged for:

deactivating the locking means coupled to the secondary transmission shaft; and coupling rotatably the secondary transmission shaft to the primary transmission shaft, through the first engagement means;

wherein a rotation to the primary transmission shaft is generated at least by the kinetic energy accumulated by the flywheel; and wherein the rotation of the primary transmission shaft is transmitted to the secondary transmission shaft, so as to modify the distance between the two ends of the linear actuator and decrease the force at the ends of the linear actuator.

13. The control system according to claim 12, wherein when the braking force request signal indicates a request for a decrease in force at the two ends of the linear actuator, the control unit is arranged for:

deactivating the locking means coupled to the secondary transmission shaft;

decoupling rotatably the secondary transmission shaft from the primary transmission shaft, through the first engagement means; and activating a second electric motor of the electromechanical assembly coupled to the secondary transmission shaft so as to rotate the secondary transmission shaft in a second direction of rotation of the secondary transmission shaft, opposite to a first direction of rotation of the primary transmission shaft;

wherein the rotation to the secondary transmission shaft is generated by the second electric motor, so as to modify the distance between the two ends of the linear actuator and decrease the force at the ends of the linear actuator.

14. The control system according to claim 12, wherein when the braking force request signal indicates a request to maintain force at the two ends of the linear actuator, the control unit is arranged for:

decoupling rotatably the secondary transmission shaft from the primary transmission shaft, by disconnecting the first engagement means; and activating the locking means coupled to the secondary transmission shaft, so as to stop the rotation of the secondary transmission shaft and keep constant the distance between the two ends of the linear actuator and keep constant the force at the ends of the linear actuator.

15. The control system according to claim 9, wherein the electromechanical assembly further comprises:

a linear actuator extendable from a first retracted position, wherein two ends of the linear actuator are at a first distance, to a second extended position, in which said ends of the linear actuator are located at a second distance, greater than the first distance, said linear actuator being arranged to actuate said braking system;

wherein the control unit is arranged to receive a braking force request signal;

wherein when the braking force request signal indicates a request for force increase at the two ends of the linear actuator, the control unit is arranged for:

deactivating the locking means coupled to the secondary transmission shaft;

coupling rotatably the secondary transmission shaft to the primary transmission shaft, through the first engagement means; and coupling rotatably the flywheel to the primary transmission shaft, through a second engagement means of the electromechanical assembly;

wherein a rotation to the primary transmission shaft is generated at least by the kinetic energy accumulated by the flywheel; and wherein the rotation of the primary transmission shaft is transmitted to the secondary transmission shaft, so as to modify the distance between the two ends of the linear actuator and decrease the force at the ends of the linear actuator.

16. The control system according to claim 15, wherein when a decrease in force at the two ends of the linear actuator is required, the control unit is arranged for:

deactivating the locking means coupled to the secondary transmission shaft;

coupling rotatably the secondary transmission shaft to the primary transmission shaft, through the first engagement means;

decoupling rotatably the primary transmission shaft from the flywheel, through the second engagement means; and activating the first electric motor so as to rotate the primary transmission shaft in a second direction of rotation of the primary transmission shaft, opposite to a first direction of rotation of the primary transmission shaft;

wherein the rotation of the secondary transmission shaft generated by the first electric motor is configured to modify the distance between the two ends of the linear actuator so as to decrease the force at the ends of the linear actuator.

17. The control system according to claim 15, wherein when the control unit detects a loss of power of the electric power source, the control unit is arranged for:

decoupling rotatably the secondary transmission shaft from the primary transmission shaft through the first engagement means; and coupling rotatably the flywheel to the primary transmission shaft, through the second engagement means;

wherein the rotation to the primary transmission shaft, generated by the kinetic energy accumulated by the flywheel, is transmitted to the first electric motor;

wherein the kinetic energy transmitted by the flywheel is converted into electrical energy by the control system, and wherein the converted electrical energy is used by the control system to power the control unit of the control system.

18. A braking system for a railway vehicle, the braking system including:

an electromechanical assembly for the braking of the railway vehicle comprising a flywheel arranged to accumulate kinetic energy sufficient to operate the electromechanical assembly for at least one emergency brake action, service brake action, or parking brake action of the braking system;

a control system for the electromechanical assembly; and braking means arranged to apply a braking force, directly or indirectly, to at least one wheel of the railway vehicle;

wherein the application of the braking force is controlled by extension or retraction movement of a linear actuator of the electromechanical assembly, the linear actuator being extendable from a first retracted position, wherein two ends of the linear actuator are at a first distance, to a second extended position, in which said ends of the linear actuator are located at a second distance, greater than the first distance, said linear actuator being arranged to actuate said braking system.

19. The braking system according to claim 18, comprising a lever system interposed between said linear actuator and said braking means, the lever system being arranged to be connected to the two ends of the linear actuator and to control the braking force applied by said braking means as a function of a distance between the two ends of the linear actuator.

20. The braking system according to claim 18, wherein the braking force applied by the braking means increases as the distance between the two ends of the linear actuator decreases and decreases as the distance between the two ends of the linear actuator increases; or wherein the braking force applied by the braking means increases as the distance between the two ends of the linear actuator increases and decreases as the distance between the two ends of the linear actuator decreases.

*   *   *   *   *